United States Patent
Nagata

(10) Patent No.: US 9,073,435 B2
(45) Date of Patent: Jul. 7, 2015

(54) VEHICLE DISPLAY SYSTEMS WITH VISUAL WARNING MANAGEMENT

(71) Applicant: Toyota Motor Engineering & Manufacturing North America, Inc., Erlanger, KY (US)

(72) Inventor: Katsumi Nagata, Dearborn, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 111 days.

(21) Appl. No.: 13/723,293

(22) Filed: Dec. 21, 2012

(65) Prior Publication Data

US 2014/0180536 A1 Jun. 26, 2014

(51) Int. Cl.
| | | |
|---|---|---|
| G06F 7/00 | (2006.01) |
| G08G 1/123 | (2006.01) |
| B60K 35/00 | (2006.01) |
| G08G 1/052 | (2006.01) |
| G02B 27/01 | (2006.01) |
| G07C 5/00 | (2006.01) |
| G07C 5/08 | (2006.01) |

(52) U.S. Cl.
CPC ............. B60K 35/00 (2013.01); G08G 1/052 (2013.01); G02B 27/01 (2013.01); G07C 5/00 (2013.01); *G02B 2027/014* (2013.01); *G07C 5/0808* (2013.01); *G07C 5/0816* (2013.01)

(58) Field of Classification Search
CPC ............. B60K 2350/352; B60K 2350/1016; B60K 2350/1068; G01D 7/02; G06F 17/00; G06F 3/012; G06F 3/013; G06F 3/0416; H04B 1/082; G01C 21/36; G08G 1/16; H04N 13/0477; H04N 13/0481
USPC ........................... 701/400–541; 340/988–996
See application file for complete search history.

(56) References Cited

U.S. PATENT DOCUMENTS

| | | | | |
|---|---|---|---|---|
| 2010/0079270 | A1* | 4/2010 | Krautter et al. | ............... 340/436 |
| 2012/0139816 | A1 | 6/2012 | King et al. | |
| 2013/0009759 | A1* | 1/2013 | Kinoshita et al. | .......... 340/425.5 |

FOREIGN PATENT DOCUMENTS

| | | |
|---|---|---|
| JP | 2002225592 | 8/2002 |
| WO | 9931637 | 6/1999 |
| WO | 2012009620 | 12/2012 |

OTHER PUBLICATIONS

Doshi et al, A Novel Active Heads-Up Display for Driver Assistance, Cybernetics 39(1):85-93, Feb. 2009.

* cited by examiner

*Primary Examiner* — Muhammad Shafi
(74) *Attorney, Agent, or Firm* — Dinsmore & Shohl, LLP

(57) ABSTRACT

A vehicle diagnostic and display system includes a vehicle diagnostic system including one or more sensors and a diagnostic processor that receives a signal from the one or more sensors indicative of a vehicle condition and determines if a warning condition is present based on the signal. A vehicle display system includes a first display, a second display and a display processor that displays a visual warning received from the diagnostic processor on only one of the first and second displays.

9 Claims, 5 Drawing Sheets

VEHICLE DISPLAY SYSTEMS WITH VISUAL WARNING MANAGEMENT

TECHNICAL FIELD

The present specification generally relates to vehicle display systems and, more particularly, to vehicle display systems that utilize visual warning management.

BACKGROUND

Vehicle head-up displays (HUDs) display images by projecting light emitted from a projection device onto a transparent window surface within the vehicle. Typical information displayed by the HUD includes speed information, fuel information, temperature information and navigation information. The same information may also be displayed elsewhere, for example, on a display screen within the vehicle (e.g., in the dashboard).

With an increasing number of displays being used within vehicles, a variety of information may be displayed at a number of locations. Duplicate information may also be displayed on multiple displays. Vehicle display systems managing where and what types of information to be displayed are desired.

SUMMARY

In one embodiment, a vehicle diagnostic and display system includes a vehicle diagnostic system including one or more sensors and a diagnostic processor that receives a signal from the one or more sensors indicative of a vehicle condition and determines if a warning condition is present based on the signal. A vehicle display system includes a first display, a second display and a display processor that displays a visual warning received from the diagnostic processor on only one of the first and second displays.

In another embodiment, a method of visual warning management within a vehicle is provided. The method includes determining a warning condition is present using sensor inputs and a diagnostic processor, determining warning information using the diagnostic processor and sending the warning information to a display processor. The warning information including a visual warning is displayed on only one of a first display or a second display within the vehicle.

In another embodiment, a method of visual warning management within a vehicle is provided. The method includes determining a warning condition is present using sensor inputs and a diagnostic processor. A visual warning associated with the warning condition is displayed only on a head-up display if the head-up display is operational.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to vehicle display systems that utilize visual warning management to logically determine where to display visual warnings to a driver where there are multiple displays within the vehicle. The visual warnings may be generated using a vehicle diagnostic system that monitors conditions throughout the vehicle. The visual warnings may be in the form of warning lights that may or may not include words, numbers and symbols including other visual indicators such as light colors and flashing. A processor may be used to determine where to display the visual warnings based, at least in part, on availability of the displays and warning type to reduce duplicate warnings being shown to the driver from multiple displays simultaneously.

Figure 1:
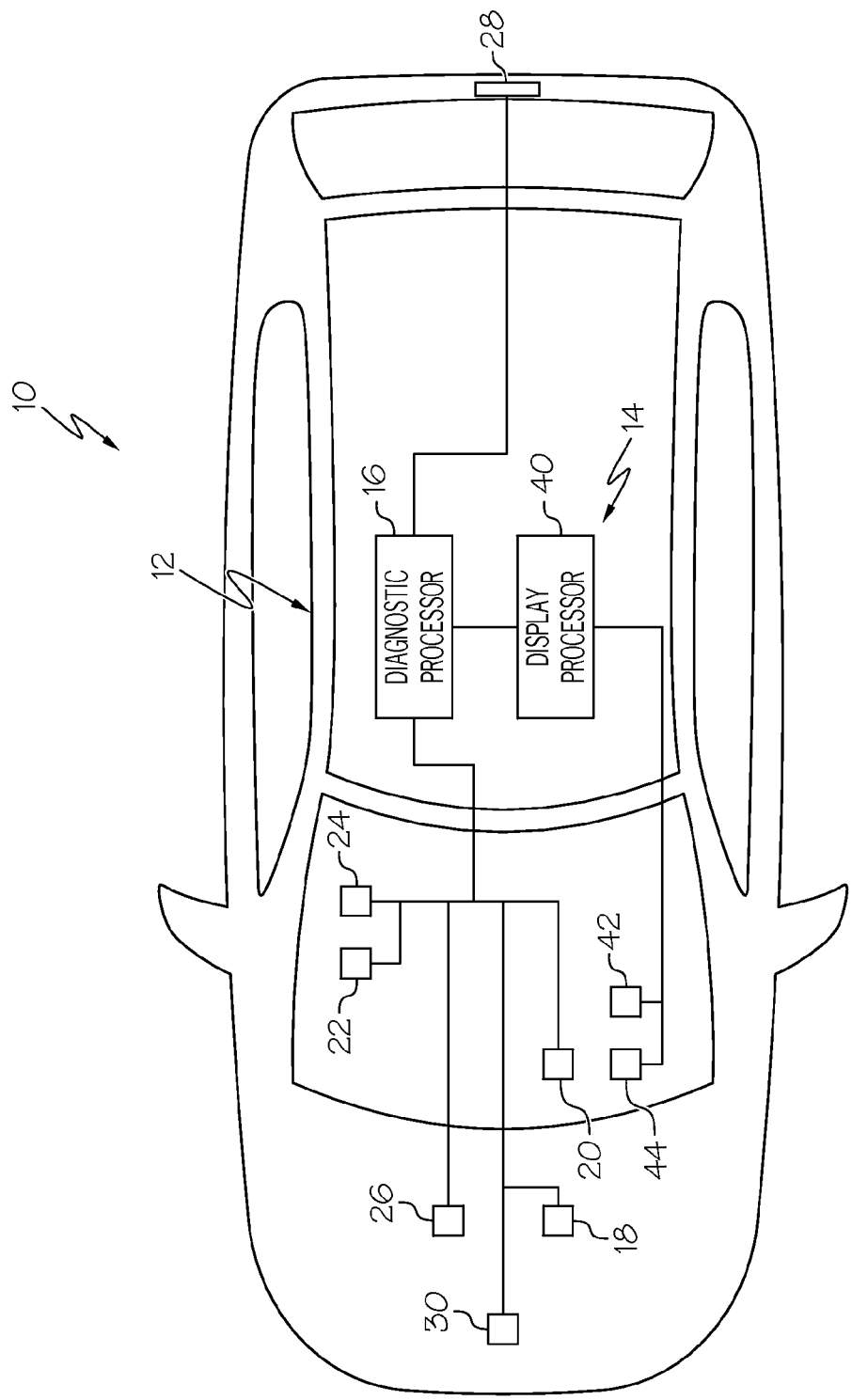
FIG. 1 is a schematic illustration of a vehicle including a vehicle diagnostic system and a vehicle display system according to one or more embodiments described herein.

Referring to FIG. 1, a vehicle 10 includes a vehicle diagnostic system 12 and a vehicle display system 14. The vehicle diagnostic system 12 is used to monitor conditions throughout the vehicle 10 and includes a diagnostic processor 16 that receives inputs from a number of sensors (e.g., sensor 18) located at various locations on the vehicle 10. The term "sensor" generally refers to a device that provides a signal in response to a stimulus. Exemplary sensors may include airbag sensors, chemical sensors, stress or strain sensors, pressure sensors, load sensors, magnetic sensors, coolant thermometers, oil pressure sensors, oil level sensors, air flow meters, brake pressure sensors, tire pressure sensors, GPS receivers, and coolant pressure sensors, to name a few.

The vehicle 10 includes numerous sensors as part of the vehicle diagnostic system. For example, sensor 18 may be a deceleration sensor that is part of an anti-lock brake system (ABS). While sensor 18 may be associated with the ABS system, it should be noted that any of the sensors discussed herein may be associated with more than one vehicle system. For example, sensor 18 may be used by vehicle systems other than the ABS system. Sensor 20 may be a steering wheel position sensor that is part of an active steering system. Sensors 22 and 24 may be room temperature and humidity sensors, respectively, that are part of an air conditioning system. Sensor 26 may be an engine coolant temperature sensor, which may also be used by the air conditioning system. Sensor 28 may be a back door position switch, which can be used to detect the back door in an open position. Sensor 30 may be a voltage sensor that detects battery voltage. Other exemplary sensors include crash sensors, chemical sensors, electric field sensors, vapor sensors, stress sensors, strain sensors, pressure sensors, weight sensors, thermometers, oil pressure sensor, oil level sensors, air flow meters, throttle position sensors, velocity sensors, wheel speed sensors, angular sensors, etc.

The various sensors can provide signals to the diagnostic processor 16 that are indicative of vehicle conditions, vehicle systems and/or components of the vehicle 10. In some instances, the diagnostic processor 16 may determine, based on the inputs from the sensors that one or more vehicle systems are operating normally. In other instances, the diagnostic processor 16 may determine, based on the inputs from the sensors that one or more vehicle systems are operating abnormally. In these instances, the diagnostic processor 16 may analyze the outputs from the sensors to determine the abnormal operation of a vehicle component and/or system. For example, the diagnostic processor 16 may determine whether the inputs from one or more of the sensors fall outside a predetermined range or threshold value saved in memory. This determination may be used by the diagnostic processor 16 to alert an occupant of the vehicle 10, such as the driver. Accordingly, an output or warning information may be provided by the diagnostic processor 16 to a display processor 40 of the vehicle display system 14.

Figure 2:
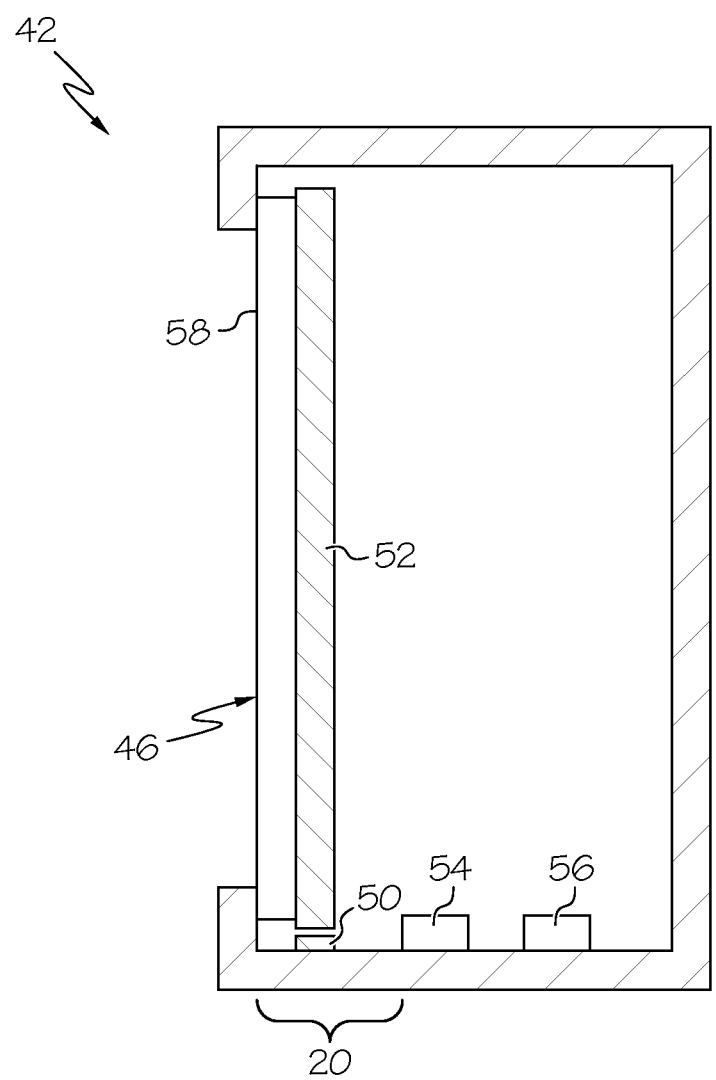
FIG. 2 is a schematic illustration of a display for use in the vehicle display system of FIG. 1 according to one or more embodiments described herein.

The vehicle display system 14 includes the display processor 40 and multiple displays 42 and 44 that provide vehicle information to the driver. Referring briefly to FIG. 2, the display 42 may be a console or dashboard-type display and may include, for example, an LCD 46, a liquid crystal display, a light source 48 including a light emitting diode 50 and a diffuser 52, an LCD driver portion 54, and a display controller portion 56, which may or may not include the display processor 40. The LCD 46 may be a thin-film-transistor (TFT) penetration LCD, as an example. The LCD 46 may be installed in front of the driver's seat in a manner that a screen 58 faces to a driver's seat in the vehicle 10 (FIG. 1). The LCD 46 may be a dot-matrix type which has a plurality of pixels arranged in a matrix form. The LCD 46 displays a full color image on the screen 58 by driving these pixels, respectively. In this embodiment, one pixel of the LCD 46 may contain three-colored sub-pixels R, G and B which have a red, a green and a blue color filter respectively. The display 42 may be configured so that a display command signal, which directs gradient levels for the sub-pixels for every pixel, is supplied to the LCD driver portion 54 driving the LCD 46. While 2-D displays may be used, such as LCDs, LEDs and, OLEDs, 3-D displays may be used.

Figure 3:
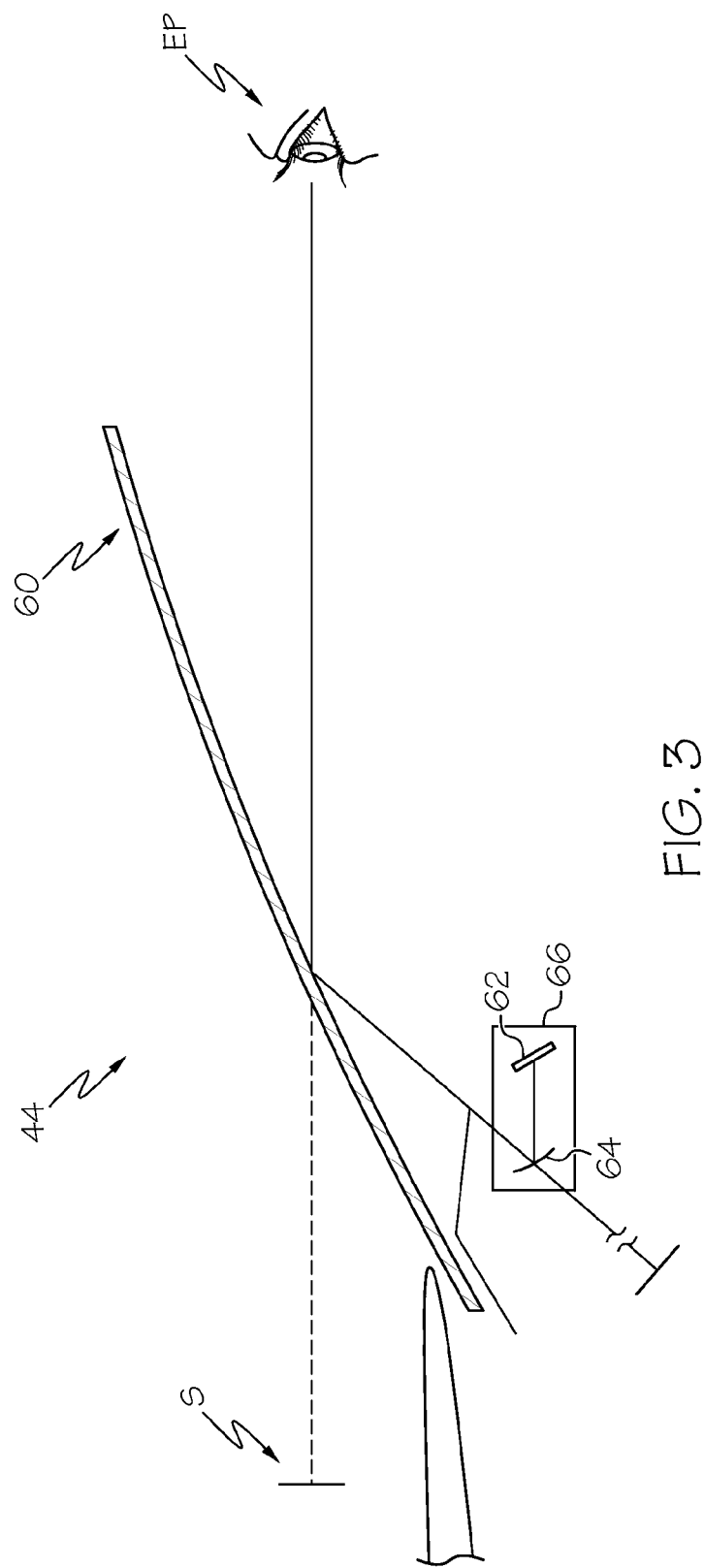
FIG. 3 is a schematic illustration of another display for use in the vehicle display system of FIG. 1 according to one or more embodiments described herein.

Referring to FIG. 3, the display 44 may be a head-up display (HUD) in which an image is displayed on a windshield 60 and subjected to be seen by the driver with a forward view through the windshield 60. As one example illustrated by FIG. 3, the display 44 may include a display source 62 (e.g., a projector) that projects an image onto a reflecting member 64 (e.g., a collimator), such as a concave minor or convex lens. The display 44 may include a housing 66 that houses the display source 62 and the reflecting member 64, which is located in the console or dashboard of the vehicle 10. The reflecting member 64 may be arranged such that a position of an eye point EP of the driver causes a virtual image S to be seen by the driver. Other display technologies may be used for one or both of the displays 42 and 44, such as LCDs, liquid crystal on silicon (LCoS), digital micro-mirrors (DMS) and organic light-emitting diode (OLED). Instead or in addition to of the display 44 being an HUD, a head-mounted display (HMD) may be used. Additionally more than two displays may be used, such as three or more, such as four or more depending, for example, on the size and seating arrangement of the vehicle 10.

Figure 4:
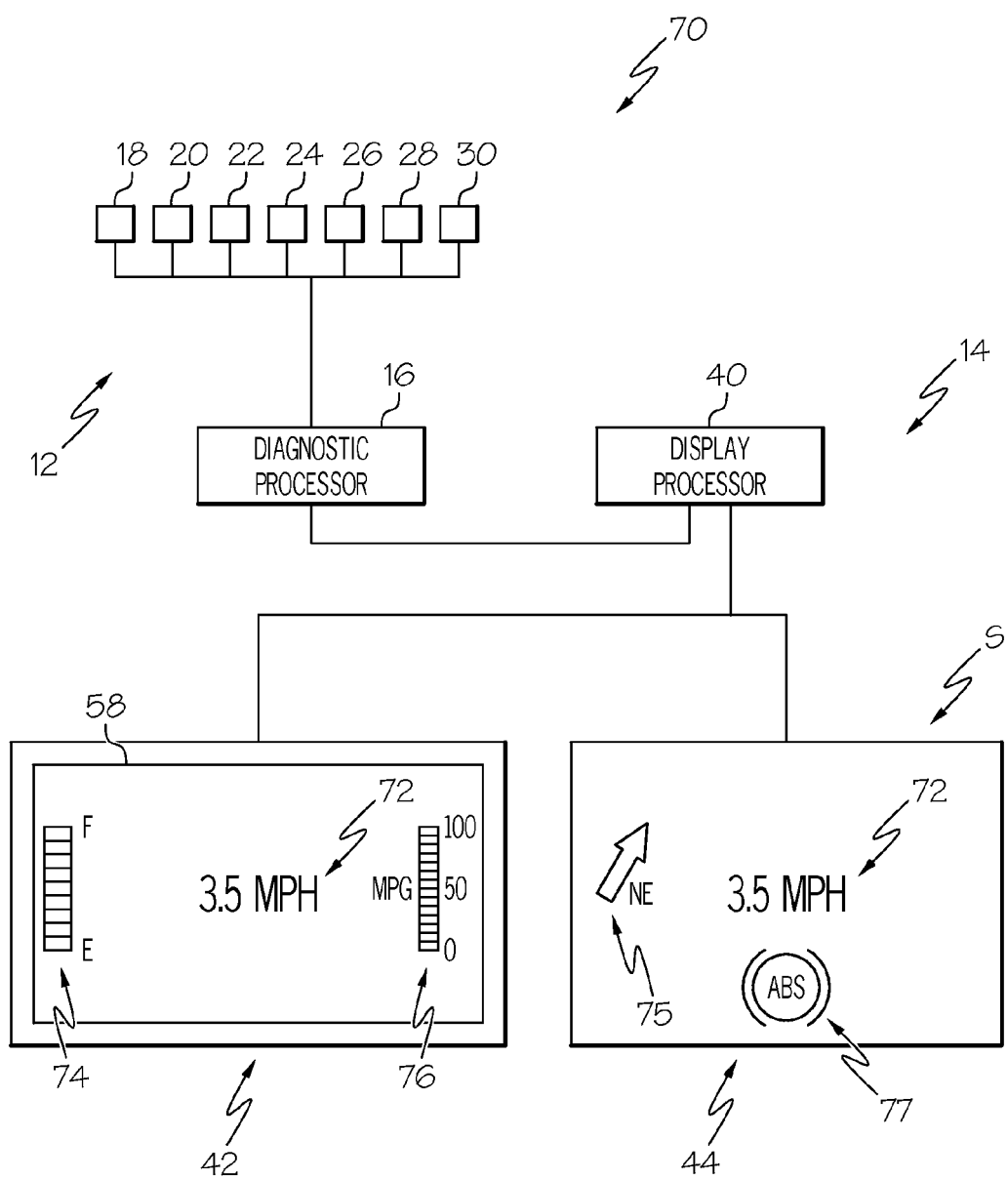
FIG. 4 is a schematic illustration of a vehicle diagnostic and display system according to one or more embodiments described herein.

Referring to FIG. 4, a schematic illustration of the vehicle diagnostic system 12 and the vehicle display system 14 is illustrated, together referred to as a vehicle diagnostic and display system 70. The vehicle diagnostic and display system 70 includes the vehicle diagnostic system 12 including the exemplary sensors 18, 20, 22, 24, 26, 28 and 30 and the diagnostic processor 16 that receive the signals from the sensors 18, 20, 22, 24, 26, 28 and 30 that are indicative of vehicle conditions, vehicle systems and/or individual components of the vehicle 10. The vehicle display system 14 includes the displays 42 and 44 and the display processor 40. As mentioned above, while two displays are shown, more than two displays may be used.

The display 42, as mentioned above, may be a console or dashboard-type display or a display located at the instrument cluster forward of a steering wheel. In the example of FIG. 4, the display 42 includes the screen 58 displaying various vehicle information such as speed information 72, fuel level information 74 and fuel economy information 76. In some embodiments, the display 42 may be a multi-information display that has a number of selectable modes for displaying other information.

The display 44 may be an HUD that is viewable at the windshield. In the example, the display 44 includes the image S that is seen by the driver displaying various information such as speed information 72 and direction information 75 (e.g., from a GPS system). The display 44 may also have multiple modes that are selectable by the driver for displaying other information.

During operation of the vehicle, outputs are received from the sensors 18, 20, 22, 24, 26, 28 and 30 by the diagnostic processor 16. Under normal operating conditions, the display processor 40 instructs or otherwise controls the displays 42 and 44 to display their normal operating information, such as that illustrated by FIG. 4, and/or selected by the driver. In some instances, the display 42 and the display 44 may display the same information, such as speed information (e.g., current speed of travel). When the diagnostic processor 16 detects an out-of-parameter operating condition using the one or more sensors 18, 20, 22, 24, 26, 28 and 30, the diagnostic processor 16 may determine whether a warning condition is present. The diagnostic processor 16 may determine whether a warning condition is present based on a number of factors, such as the type of signal, the origin of the signal (e.g., which sensor is providing the signal), which system or component is affected and/or what combination of sensors provide an out-of-parameter signal. If a warning condition is present, warning information including a visual warning 77 may be displayed on only one of the displays 42 and 44, depending on display processor logic.

Figure 5:
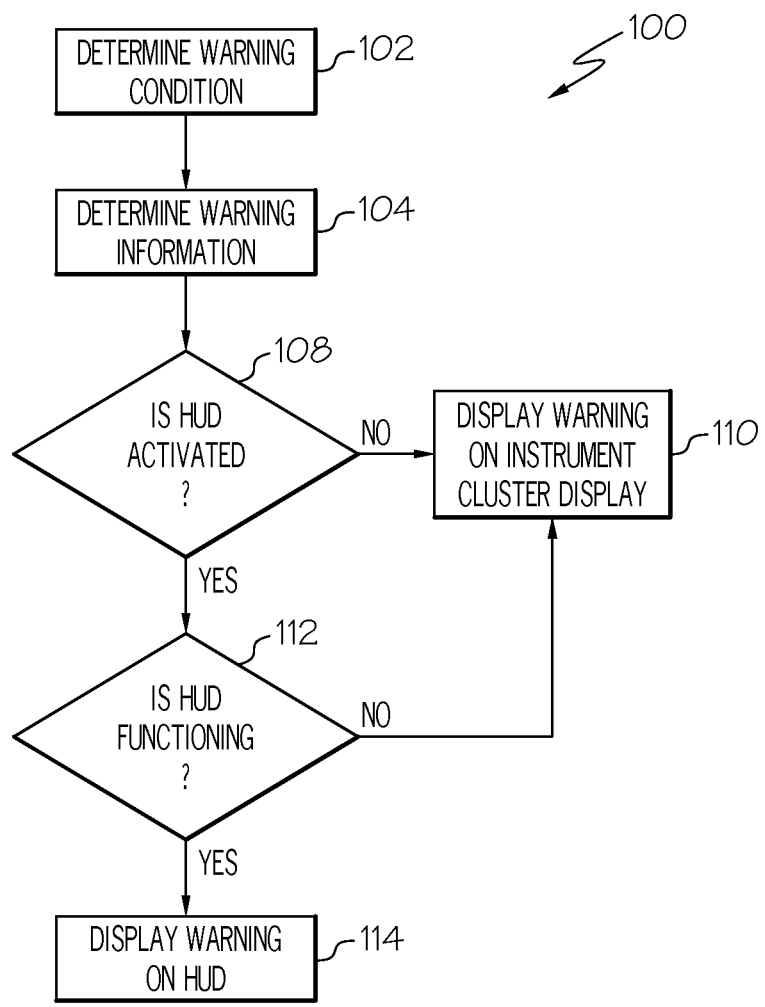
FIG. 5 illustrates a method of visual warning management according to one or more embodiments described herein.

Referring to FIG. 5, a method 100 of visual warning management includes the diagnostic processor 16 determining a warning condition is present at step 102 using the sensor inputs. At step 104, the diagnostic processor 16 determines what type of visual warning to display based on warning logic and the sensor inputs. The diagnostic processor 16 may provide warning information to the display processor 40, which may include the type of warning to display. In other embodiments, the display processor 40 may determine the type of warning to display based on the warning information. At step 108, the display processor 40 determines whether the display 44 (e.g., the HUD) is activated (i.e., turned ON). If the display is not activated, the display processor 40 instructs the other display 42 (e.g., the instrument cluster display) to display the visual warning at step 110. If the display 44 is activated, the display processor 40 determines if the display 44 is functioning properly at step 112. If the display 44 is not functioning properly, the display processor 40 instructs the other display 42 to display the visual warning at step 110. If the display 44 is functioning properly, the display processor 40 instructs the display 44 to display the visual warning at step 114. Steps 108 and 112 may be referred to as determining an operational status of the display 44. Thus, the visual warning is displayed at only one display location, which is determined logically by the display processor 40 based on the operational status (ON/OFF, functioning non-functioning) of the display 44, which may be the HUD.

The above-described vehicle diagnostic and display systems logically determine a display location for visual warning, so that the visual warnings are not displayed in multiple locations, which can distract a driver during a warning condition. The display processor can display the visual warnings on the HUD by default, unless the HUD is not functioning properly or is not activated. In instances where the HUD is not functioning properly or not activated, the visual warnings may be displayed on a different display, such as an instrument panel display.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of visual warning management within a vehicle, the method comprising:
    determining a warning condition is present using sensor inputs and a diagnostic processor;
    determining warning information using the diagnostic processor and sending the warning information to a display processor;
    determining an operational status of a head-up display;
    displaying the warning information including a visual warning on only one of the head-up display or a second display within the vehicle; and
    displaying the warning information only on the second display based on the operational status of the head-up display.

2. The method of claim 1, wherein the display processor displays the visual warning only on the head-up display by default.

3. The method of claim 1, wherein the second display is an instrument cluster display.

4. The method of claim 1 further comprising displaying vehicle information on both the first and the second displays.

5. The method of claim 4, wherein the vehicle information includes vehicle speed information.

6. A method of visual warning management within a vehicle, the method comprising:
    determining a warning condition is present using sensor inputs and a diagnostic processor;
    displaying a visual warning associated with the warning condition only on a head-up display if the head-up display is operational; and
    displaying the visual warning on a second display if the head-up display is not operational.

7. The method of claim 6 further comprising determining if the head-up display is operational using a display processor.

8. The method of claim 6, wherein the second display is an instrument cluster display.

9. The method of claim 6 further comprising displaying vehicle information on both the head-up display and the second display.

\* \* \* \* \*